(12) United States Patent
Fontela et al.

(10) Patent No.: US 8,002,154 B2
(45) Date of Patent: Aug. 23, 2011

(54) FLUID PRODUCT DISPENSING VALVE

(75) Inventors: Jacques Fontela, Vitot (FR); Matthieu Savalle, Rouen (FR)

(73) Assignee: Valois SAS, Le Neubourg (FR)

( * ) Notice: Subject to any disclaimer, the term of this patent is extended or adjusted under 35 U.S.C. 154(b) by 726 days.

(21) Appl. No.: 11/996,186

(22) PCT Filed: Jul. 21, 2006

(86) PCT No.: PCT/EP2006/064521
§ 371 (c)(1),
(2), (4) Date: Jan. 18, 2008

(87) PCT Pub. No.: WO2007/010043
PCT Pub. Date: Jan. 25, 2007

(65) Prior Publication Data
US 2008/0185402 A1 Aug. 7, 2008

(30) Foreign Application Priority Data
Jul. 21, 2005 (FR) ..................................... 05 07770

(51) Int. Cl.
*B65D 83/00* (2006.01)
*B65D 5/72* (2006.01)
*A61M 11/00* (2006.01)
(52) U.S. Cl. ................ 222/402.2; 222/500; 222/402.19; 128/200.23

(58) Field of Classification Search ................... 222/500, 222/402.2, 402.19, 402.23, 402.11, 402.1; 128/205.24, 200.23, 202.22
See application file for complete search history.

(56) References Cited

U.S. PATENT DOCUMENTS

| | | | |
|---|---|---|---|
| 2,904,229 A | | 9/1959 | Samuel |
| 3,057,500 A | * | 10/1962 | Fortuna et al. ................... 215/21 |
| 3,157,179 A | * | 11/1964 | Paullus ...................... 128/200.23 |
| 3,372,845 A | * | 3/1968 | Frangos .................... 222/402.18 |
| 4,413,755 A | * | 11/1983 | Brunet ......................... 222/402.2 |
| 4,744,495 A | * | 5/1988 | Warby ....................... 222/402.16 |
| 5,005,738 A | * | 4/1991 | Tempelman ............. 222/402.19 |
| 6,186,372 B1 | | 2/2001 | Garcia et al. |

FOREIGN PATENT DOCUMENTS

| | | |
|---|---|---|
| EP | 1 394 074 A1 | 3/2004 |
| FR | 1 598 257 A | 7/1970 |
| FR | 2 615 172 A | 11/1988 |

* cited by examiner

*Primary Examiner* — Kevin P Shaver
*Assistant Examiner* — Stephanie E Williams
(74) *Attorney, Agent, or Firm* — Sughrue Mion, PLLC

(57) ABSTRACT

A fluid dispenser valve for assembling on a fluid reservoir, the valve including a valve body containing a metering chamber, and a valve member that is slidable in leaktight manner in the valve body between a rest position and an actuated position, the valve body containing an inlet passage enabling the metering chamber to be filled with fluid, the valve body including a closure element that co-operates with the inlet passage, the closure element being movable between an open position in which the inlet passage is open, and a closed position in which the inlet passage is closed at least in part.

15 Claims, 6 Drawing Sheets

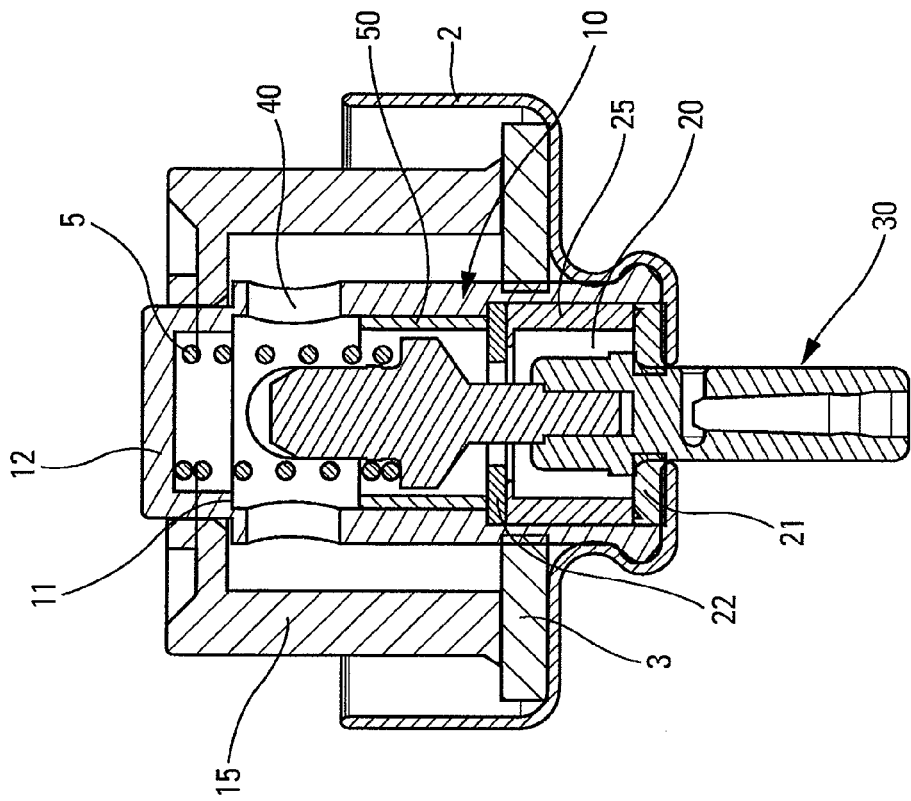
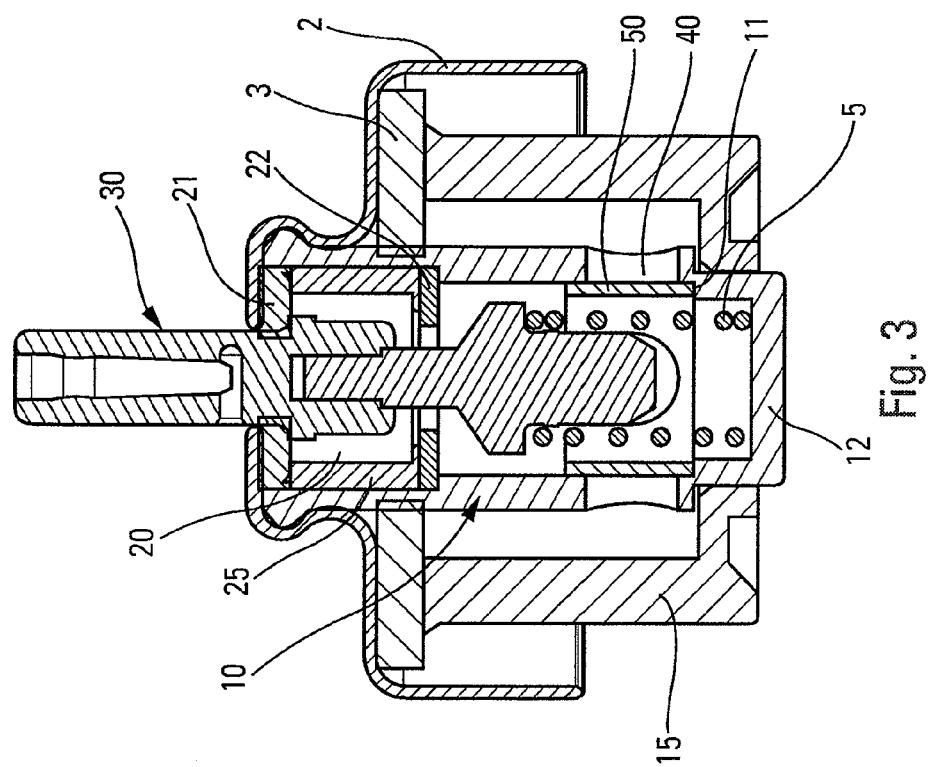
Fig. 4
Fig. 3

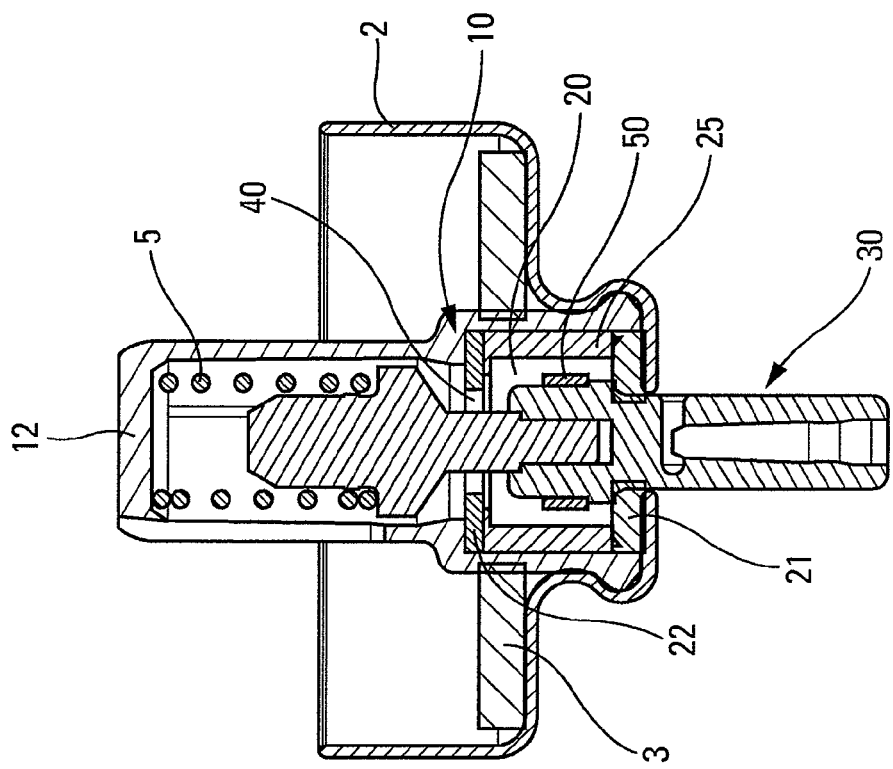
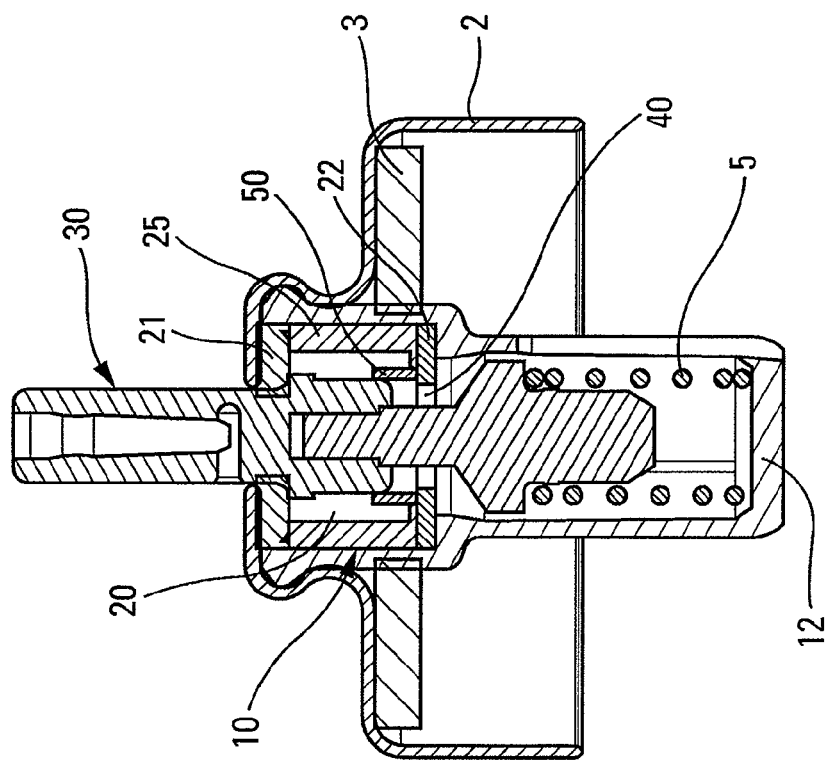

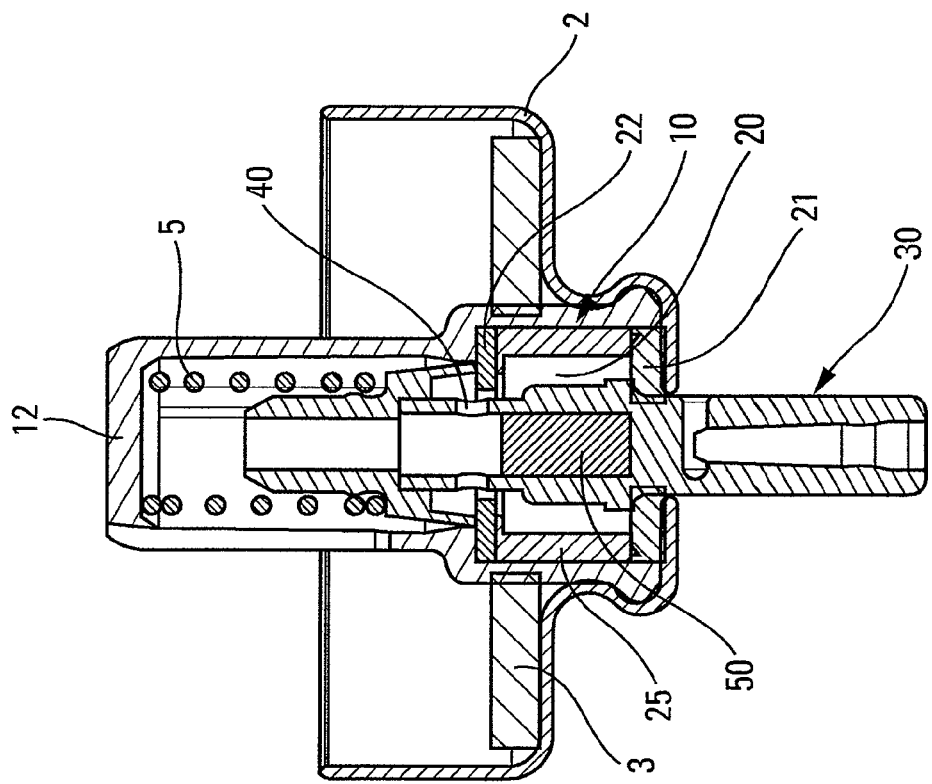
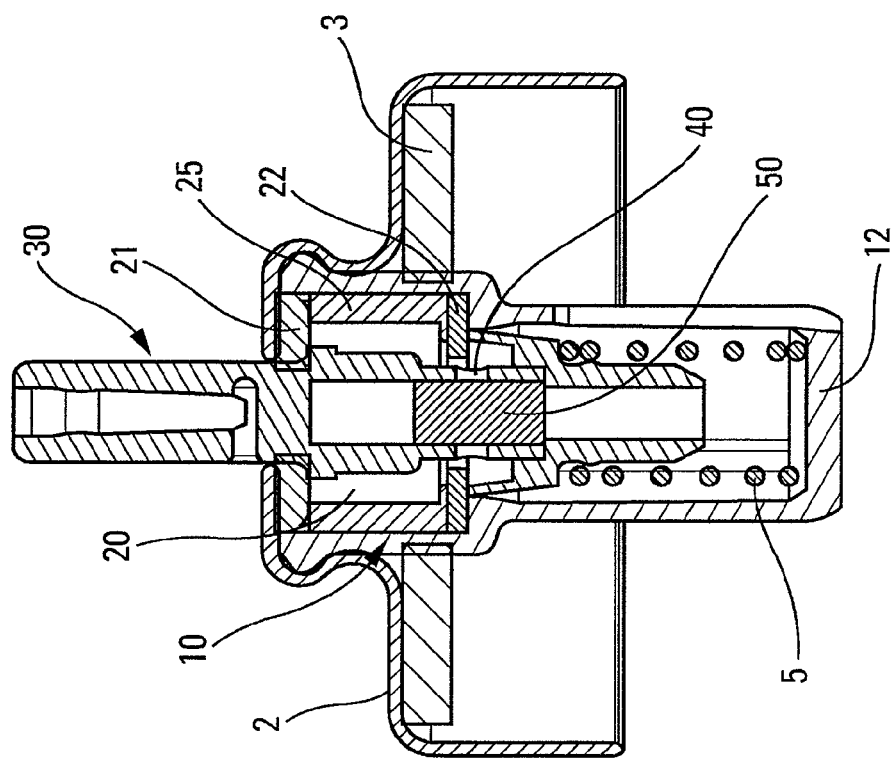

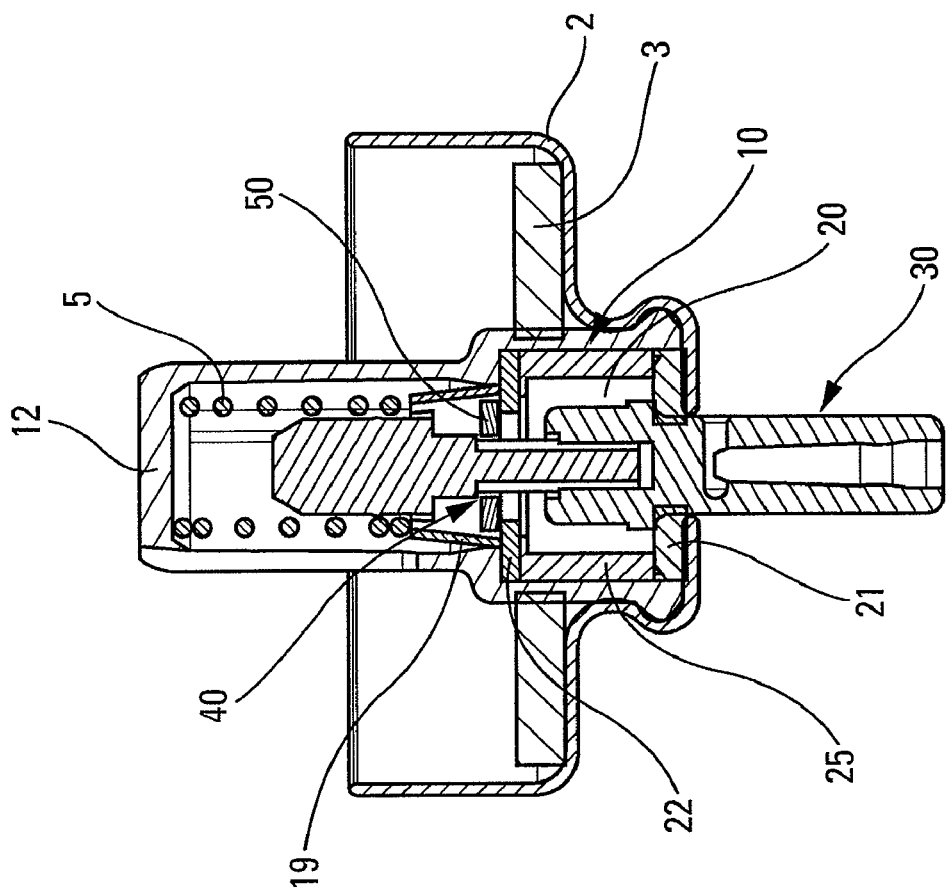
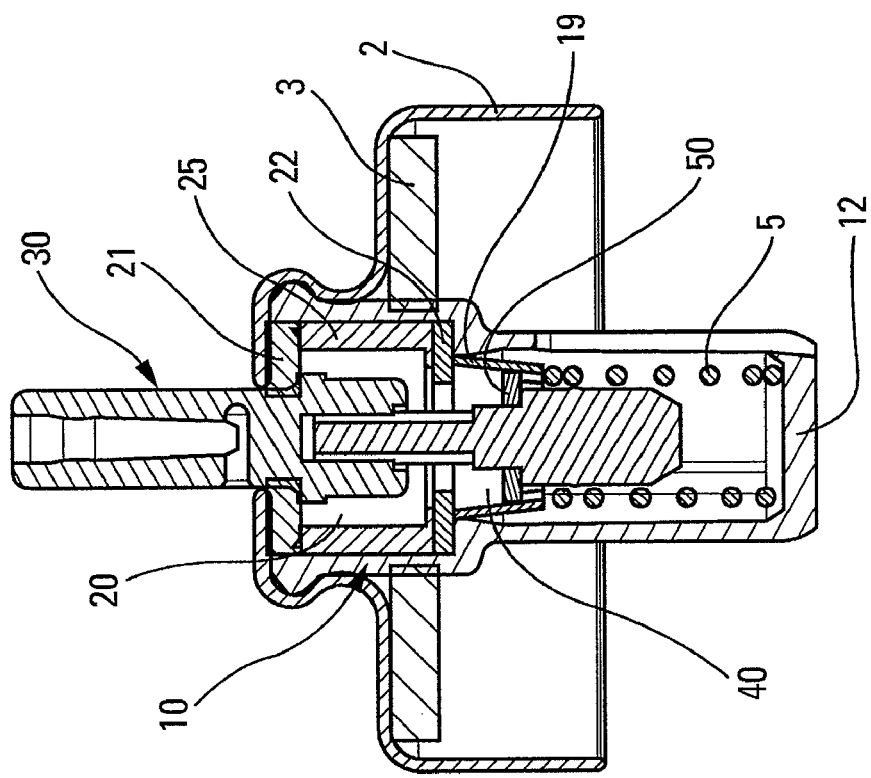

FLUID PRODUCT DISPENSING VALVE

The present invention relates to a fluid dispenser valve, and more particularly to a metering valve that is adapted to dispense a metered quantity on each actuation.

Valves, in particular metering valves, that function with a propellant gas are well known in the prior art. They generally comprise a valve body in which a valve member slides between a rest position and a dispensing position. A metering chamber is provided in the valve body, said metering chamber being emptied of its content on each actuation, and subsequently being refilled so as to prepare the next dose. Generally, that type of valve is used upsidedown, i.e. with the valve disposed below the reservoir when in use. In this event, the metering chamber is generally filled by gravity, after being emptied during a prior actuation. When the dispenser device is for storing upright, i.e. with the valve disposed above the reservoir, the metering chamber empties and the fluid returns to the reservoir. In this event, during the next use, when the user once again turns the device upsidedown, the metering chamber fills up once more and the device is thus ready to be used.

An object of the present invention is to provide a fluid dispenser valve of that type that functions in safer and more reliable manner, while being inexpensive to manufacture and to assemble.

In particular, an object of the present invention is to provide a valve that makes it possible to retain the dose in the metering chamber, even during long periods of storage.

Another object of the present invention is to provide a fluid dispenser valve that makes it possible to choose either to isolate the metering chamber completely when in the storage position, or to provide controlled return to the reservoir of the fluid contained in the metering chamber.

The present invention thus provides a fluid dispenser valve as described in claim 1.

Advantageous variants of the invention are described in the dependent claims.

The present invention also provides a fluid dispenser device including a valve as described above.

Other characteristics and advantages of the present invention appear more clearly from the following detailed description of several embodiments thereof, given by way of non-limiting example, and with reference to the accompanying drawings, in which:

FIG. 3 is a view similar to the view in FIG. 1, showing a second embodiment of the present invention;

FIG. 4 is a view similar to the view in FIG. 2, showing the second embodiment;

FIG. 5 is a view similar to the view in FIG. 1, showing a third embodiment of the present invention;

FIG. 6 is a view similar to the view in FIG. 2, showing the third embodiment of the invention;

FIG. 9 is a view similar to the view in FIG. 1, showing a fifth embodiment of the present invention;

FIG. 10 is a view similar to the view in FIG. 2, showing the fifth embodiment;

FIG. 11 is a view similar to the view in FIG. 1, showing a sixth embodiment of the present invention; and FIG. 12 is a view similar to the view in FIG. 2, showing the sixth embodiment of the invention.

Figure 1:
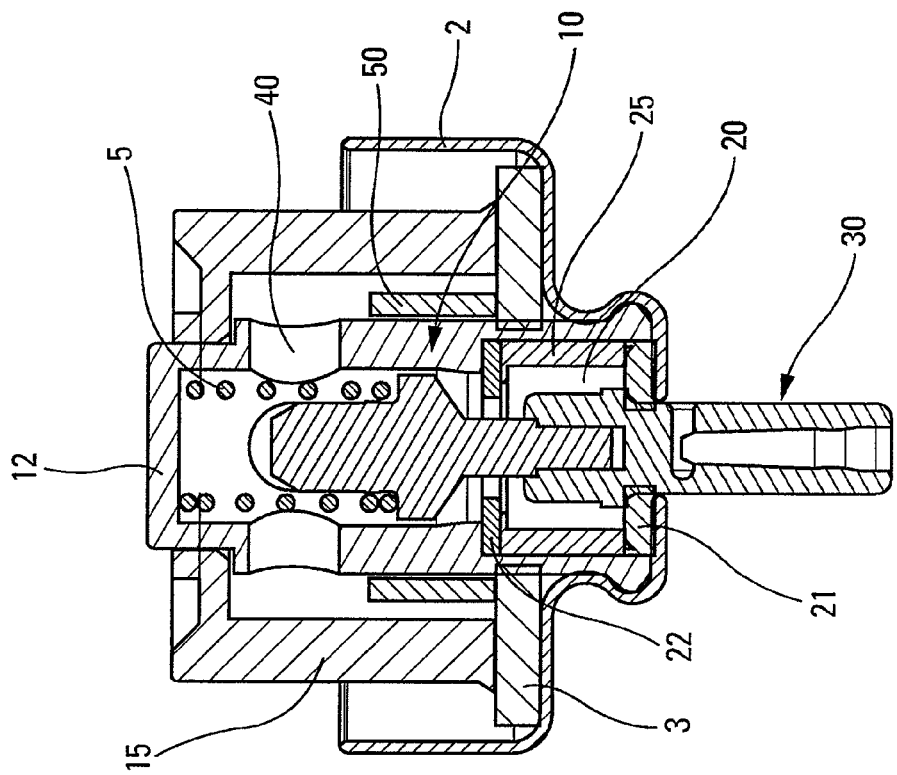
FIG. 1 is a diagrammatic section view of a valve constituting a first embodiment of the invention in the upright position.

In conventional manner, the fluid dispenser valve comprises a valve body 10 that defines a metering chamber 20. A valve member 30 slides in the valve body between a rest position and a working position in which the valve member is driven into the valve. A return spring 5 ensures that the valve member automatically returns to its rest position, when the valve is no longer actuated by the user. The metering chamber 20 is advantageously defined between two gaskets 21, 22 that both co-operate with the valve member 30 in the working position, so as to isolate the metering chamber from the reservoir (not shown) while the dose that it contains is being expelled. A hollow sleeve 25 can form the side walls of the metering chamber 20. The valve of the invention is advantageously fastened on a reservoir containing fluid (not shown), e.g. by means of a crimping cap 2, preferably with a neck gasket 3 interposed therebetween. However, any other fastener means can also be envisaged. An outer ring 15 can possibly be assembled around the valve body 10, as can be seen in FIGS. 1 to 4. In addition, a dispenser or actuator head is generally assembled on the valve member so as to enable the user to actuate said valve manually. In a variant, said valve can be assembled in an inhaler body, with actuation possibly taking place by pressure on the bottom of the reservoir (not shown). Other structures and uses of known valves can also be envisaged.

In conventional manner, an inlet passage 40 is formed between the valve and the reservoir, so as to enable the fluid contained in the reservoir to fill the metering chamber 20 after each actuation. The passage can be defined, at least in part, by an opening of the valve body, e.g. a side opening as shown in the figures. Naturally, the passage 40 can extend as far as the metering chamber 20, in which event the valve member 30 also defines a portion of the passage.

In the invention, there is provided a closure element 50 that co-operates with said inlet passage 40. The closure element 50 is movable between an open position in which said inlet passage 40 is open, and a closed position in which said inlet passage 40 is closed at least in part. In the embodiments shown in the drawings, the closure element 50 is advantageously displaced by gravity between its open and closed positions. Thus, when the valve is in the upright position, which is generally the storage position, in which the valve is disposed above the reservoir, the closure element 50 is displaced by gravity into its closed position. When the user wishes to use the device and turns the valve upsidedown, the closure element 50 is thus displaced by gravity into its open position.

The present invention makes it possible to make the closure element in such a manner that it co-operates in leaktight manner with the inlet passage 40 in the closed position. In this event, the fluid contained in the valve cannot flow out of the valve while the device is being held in the storage position, i.e. in the upright position. In embodiments in which the closure element 50 co-operates with the metering chamber 20 or with the valve member 30 at the metering chamber 20, it is possible to retain the dose inside the metering chamber 20, even during storage for a relatively long period of time.

In a variant, it is also possible to envisage the closure element 50 closing the inlet passage in non-leaktight manner, such that when the valve is upsidedown, with the closure element 50 in its closed position, the fluid contained inside the valve, in particular inside the metering chamber 20, can in spite of everything flow in optionally controlled manner out of said metering chamber, also by gravity, via said inlet passage 40.

The same valve thus makes it possible to provide both functions, and it suffices to provide a closure element 50 that closes in leaktight or non-leaktight manner in its closed position, in order to pass from one variant embodiment to another.

The advantage of retaining the dose in the metering chamber 20 is that a complete dose is guaranteed even when the valve is actuated very quickly. When the metering chamber 20 empties during storage and a user quickly turns the valve upsidedown and actuates it immediately, it is possible that the dose is incomplete when it is dispensed. The drawback of retaining the dose in the metering chamber 20 during storage is that the dose need no longer be completely homogenous. In particular, in some circumstances, the active fluid can, by sedimentation, become concentrated in the bottom portion of the metering chamber 20, such that during actuation, the dose is not completely homogenous. In fluids to be dispensed, in particular when they are medication, one or other of the solutions may be preferable. The present invention makes it possible to provide, in simple and inexpensive manner, both solutions with the same valve. In general, the invention benefits from the advantage of not having to be primed. During actuation, the user turns the device upsidedown and the chamber fills up (or is topped up on the assumption that it was not completely empty), and the valve is operational without needing to be primed. In addition, a complete dose is thus guaranteed on each actuation as a result of the metering chamber being filled up or topped up before each actuation.

Figure 2:
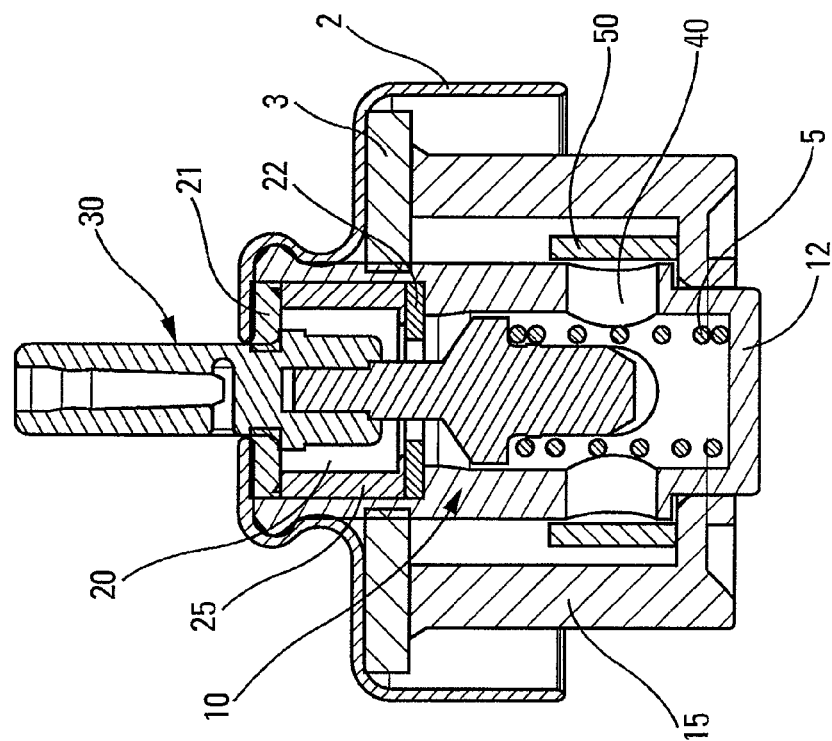
FIG. 2 is a view similar to the view in FIG. 1, in the upsidedown position.

FIGS. 1 and 2 show a first embodiment of the invention. In this first embodiment, the closure element 50 is a sleeve that is slidable over the outside the valve body 10. In the closed position, the closure element 50 advantageously co-operates with the outer ring 15 assembled around the valve body 10 and/or directly with the valve body 10.

FIGS. 3 and 4 show a second embodiment in which the sleeve 50 slides inside the valve body. In this event, the closure element 50 advantageously co-operates with a shoulder 11 that is provided in the valve body 10. In a variant, it can also co-operate with the bottom wall 12 of the valve body.

FIGS. 5 and 6 show a third embodiment in which the closure element 50 is also a slidable sleeve, but this time around the valve member 30. In particular, in this embodiment, the slidable sleeve 50 is disposed in the metering chamber 20. In this embodiment, since the inlet passage is closed in leaktight manner in the rest position (FIG. 5), it is possible to retain the dose inside the metering chamber 20, even during relatively long storage.

Figure 8:
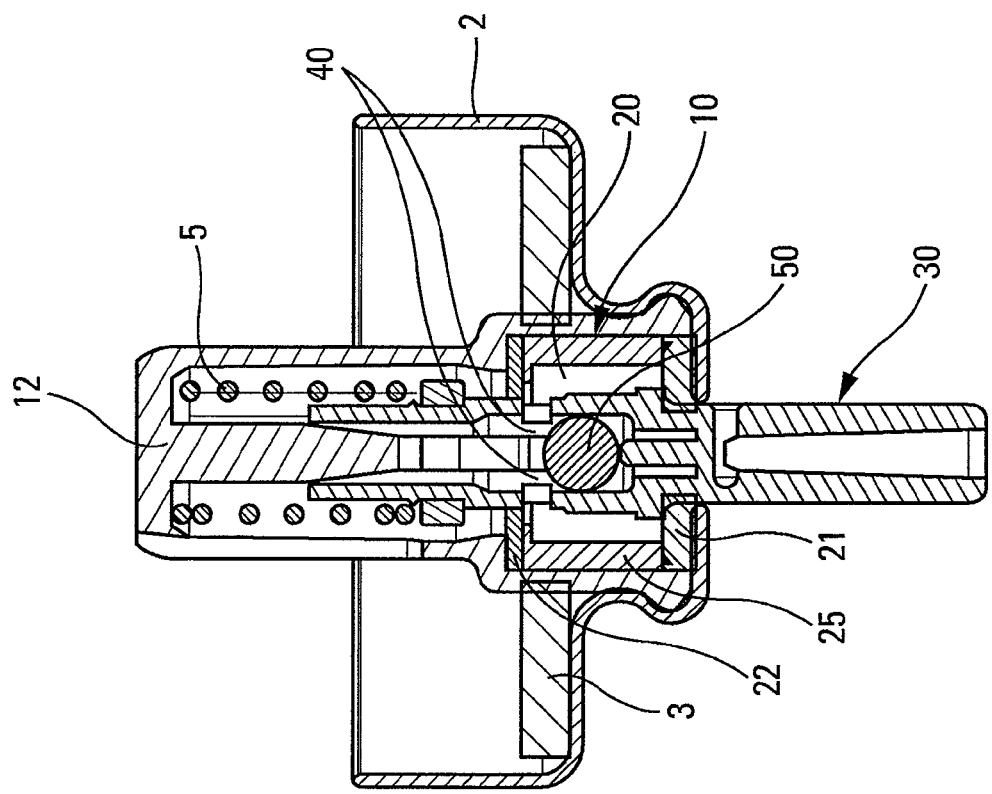
FIG. 8 is a view similar to the view in FIG. 2, showing the fourth embodiment of the present invention.
Figure 7:
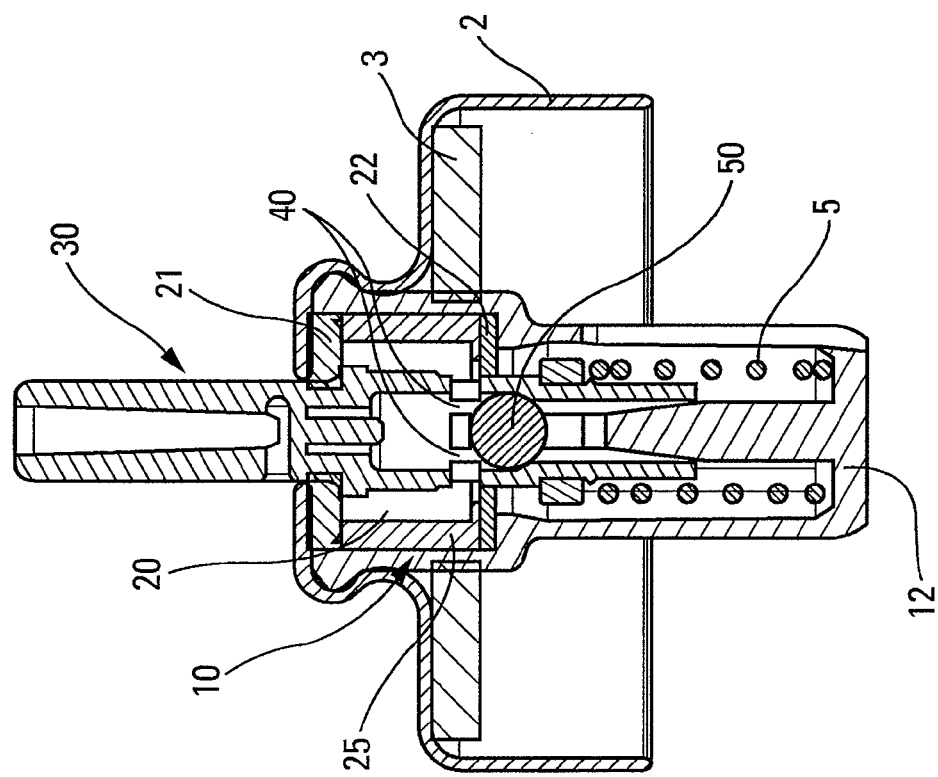
FIG. 7 is a view similar to the view in FIG. 1, showing a fourth embodiment of the present invention.

FIGS. 7 and 8 show a fourth embodiment of the invention in which the inlet passage 40 extends, at least in part, inside the valve member 30. In this embodiment, the closure element 50 is formed by a bead that is disposed inside the valve member 30.

FIGS. 9 and 10 show a fifth embodiment of the invention in which the closure element 50 is also disposed inside the valve member, but in this event is formed by a slidable lug or tube.

FIGS. 11 and 12 show a sixth embodiment of the invention in which the closure element 50 is slidable around the valve member 30, but unlike the embodiment in FIGS. 5 and 6, the closure element 50 slides around the valve member 30 outside the metering chamber 20. In this embodiment, the closure element 50 can be an annular ring that is adapted to co-operate firstly with the inside portion of the valve member 30, and secondly with a side wall of the valve body 10. In the embodiment shown in FIGS. 11 and 12, the closure element 50 co-operates with a frustoconical sleeve 19 that extends inside the valve body 10 from a bottom gasket 22 of the metering chamber 20. Obviously, other embodiments could also be envisaged.

Thus, as described above, various solutions could be envisaged in order to make the invention. The principle of the invention consists in providing an element 50 that is movable inside a metering valve, the movable element being displaced by gravity between its open position and its closed position. The closed position can be a completely closed position, i.e. in which the inlet passage is completely closed in leaktight manner, or it can be a closed position that is not leaktight, enabling the fluid to flow back to the reservoir in controlled manner.

The materials used to make the closure element 50 can be of any known type, in particular the materials normally used to make valve bodies, valve members, or valve gaskets. It is also possible to use metal, e.g. for a bead as described with reference to FIGS. 7 and 8.

It should also be understood that the structure of the valve shown in the drawings is given only by way of illustration, and that the present invention applies to any type of metering valve. In particular, the valve body, the valve member, the metering chamber, and/or the gaskets could be made in some other way.

Although the present invention is described above with reference to several embodiments thereof, naturally it is not limited by the embodiments shown, and any useful modification could be applied thereto by a person skilled in the art, without going beyond the ambit of the present invention, as defined by the accompanying claims.

The invention claimed is:

1. A fluid dispenser valve for assembling on a fluid reservoir, the valve comprising a valve body (10) containing a metering chamber (20), and a valve member (30) that is slidable in leaktight manner in said valve body (10) between a rest position and an actuated position, said valve body containing an inlet passage (40) enabling said metering chamber (20) to be filled with fluid,
wherein said valve body includes a closure element (50) that co-operates with said inlet passage (40), said closure element (50) being movable between an open position in which said inlet passage (40) is open, and a closed position in which said inlet passage (40) is closed at least in part, said inlet passage (40) being closed in non-leaktight manner in the closed position of said closure element (50), such that the fluid contained inside the metering chamber (20) can, by gravity, slowly flow out of said metering chamber via said inlet passage (40) that is closed by said closure element (50).

2. A valve according to claim 1, in which said closure element (50) is displaced by gravity between its open and closed positions.

3. A valve according to claim 1, in which said flow rate in the closed position of the closure element is predeterminable.

4. A valve according to claim 1, in which said inlet passage (40) is formed in the valve body (10).

5. A valve according to claim 4, in which said closure element (50) is a sleeve that slides relative to the valve body.

6. A valve according to claim 4, in which said closure element (50) slides over the outside of the valve body (10).

7. A valve according to claim 4, in which said closure element (50) slides inside the valve body (10).

8. A valve according to claim 1, in which said inlet passage (40) is formed in the valve member (30).

9. A valve according to claim 8, in which said closure element (50) is a sleeve that slides about said valve member (30).

10. A valve according to claim 9, in which said sleeve (50) is disposed in said metering chamber (20).

11. A valve according to claim 8, in which said closure element (50) is an element that is movable inside said valve member (30).

12. A valve according to claim 11, in which said movable element is a bead.

13. A valve according to claim 11, in which said movable element is a lug.

14. A fluid dispenser device including a fluid reservoir, wherein the device includes a valve according to claim 1.

15. A fluid dispenser valve for a fluid reservoir, comprising:
a valve body containing a metering chamber;
a valve member that is slidable in leaktight manner in said valve body (10) between a rest position and an actuated position;
an inlet passage formed between the valve body and the fluid reservoir, enabling fluid contained in the reservoir to fill said metering chamber; and
a closure element movable between (1) an open position in which said inlet passage is open enabling fluid contained in the reservoir to fill said metering chamber when said fluid dispenser valve is in an inverted position, and (2) a closed position in which said inlet passage is at least partially closed in a non-leaktight manner, enabling the fluid contained inside the metering chamber to slowly flow out of said metering chamber, via said inlet passage, back to the reservoir, when said dispenser valve is in an upright position.

\* \* \* \* \*